United States Patent
Srikanth et al.

(10) Patent No.: US 7,822,739 B2
(45) Date of Patent: Oct. 26, 2010

(54) METHOD FOR EXPLOITATION OF SOCIAL NETWORKS TO DERIVE A LOCATION OF EMPLOYEES

(75) Inventors: Hema Srikanth, Raleigh, NC (US); Patrick O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/023,119

(22) Filed: Jan. 31, 2008

(65) Prior Publication Data

US 2009/0198645 A1    Aug. 6, 2009

(51) Int. Cl.
*G06F 17/00* (2006.01)
(52) U.S. Cl. .................. 707/713; 707/706; 707/707; 707/708
(58) Field of Classification Search ......... 707/706–708, 707/713
See application file for complete search history.

(56) References Cited

U.S. PATENT DOCUMENTS

2007/0116226 A1* 5/2007 Bennett et al. ......... 379/202.01

OTHER PUBLICATIONS

Mind Maps and Causal Models: Using Graphical Representations of Field Research Data, [online]; [retrieved on Dec. 5, 2007]; retrieved from the Internet http://www.sigchi.org/chi97/proceedings/poster/mil.htm.

Socially Translucent Systems: Social Proxies, Persistent Conversation, and the Design of "Babble", [online]; [retrieved on Dec. 5, 2007], retrieved from the Internet http://www.pliant.org/personal/Tom_Erickson/loops.chi99.paper.html.

Semantic Studios, [online], [retrieved on Dec. 5, 2007]; retrieved from the Internet http://www.semanticstudios.com/publications/semantics/000006.php.

Creo Six Degrees Software 1.51, [online], [retrieved on Dec. 5, 2007], retrieved from the Internet http://www.tucows.com/preview/274464.

Social Networking Goes Mobile, [online], [retrieved on Dec. 5, 2007], retrieved from the Internet http://www.businessweek.com/print/technology/content/may2006/tc20060530_170086.htm.

* cited by examiner

*Primary Examiner*—Sana Al-Hashemi
(74) *Attorney, Agent, or Firm*—Cantor Colburn LLP; Daniel McLoughlin (57) ABSTRACT

A method is provided for exploitation of a social network to derive a location of an employee in a corporation utilizing instant messaging or automatic telephone calls. A search request is received for a location of an employee. A social network or acquaintance list of the employee is looked up in a corporate database. A list of contacts of the employee is extracted from the social network or acquaintance list in the corporate database. The list of contacts is presented, in response to the search request. The list of contacts is polled to locate the employee via instant messaging and/or automatic telephone calls. The location of the employee is received, in response to polling the list of contacts. The list of contacts is alerted that the employee has been located.

3 Claims, 5 Drawing Sheets

FIG. 4 ially pointed out and distinctly claimed in the claims at
METHOD FOR EXPLOITATION OF SOCIAL NETWORKS TO DERIVE A LOCATION OF EMPLOYEES

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety: METHOD FOR EXPLOITATION OF LOCATION PROXIMITY TO DERIVE A LOCATION OF EMPLOYEES UTILIZING INSTANT MESSAGING, filed Dec. 6, 2007, application Ser. No. 11/951,701.

TRADEMARKS

IBM® is a registered trademark of International Business Machines Corporation, Armonk, N.Y. U.S.A. Other names used herein may be registered trademarks, trademarks or product names of International Business Machines Corporation or other companies.

TECHNICAL FIELD

This invention relates to techniques for locating individuals, and particularly to indirect location of individuals through a third party.

DESCRIPTION OF BACKGROUND

Instant messaging has been a prevalent way of communicating and collaborating with peers around the world. Often the challenge exists when an instant messaging (IM) partner is not available on an instant messaging system (such as Lotus Sametime®, AOL instant messenger (AIM), or Yahoo Messenger), or the person may not be available via telephone, cellular telephone, short message service (SMS), email, pager, etc. Situations often arise where employees may need to be contacted immediately, e.g. for a crisis, to inform him or her of an urgent family matter, to prompt an individual to attend a meeting that he or she has accepted but inadvertently neglected attend. If the participant cannot be reached via IM, phone, email, or SMS, inefficiency may result from time lost in either not completing the task at hand on time or rescheduling the meeting to a different time. This is especially the case if the absent person is a primary/mandatory attendee. Likewise, time is wasted by other participants who arrive on time for the meeting or eMeeting.

It would be beneficial to have techniques to prevent or resolve issues related to individuals who may be absent or missing from engagements.

SUMMARY

A method is provided for exploitation of a social network to derive a location of an employee in a corporation utilizing instant messaging or automatic telephone calls in accordance with exemplary embodiments. A search request is received for a location of an employee. A social network or acquaintance list of the employee is looked up in a corporate database. A list of contacts of the employee is extracted from the social network or acquaintance list in the corporate database. The list of contacts is presented, in response to the search request. The list of contacts is polled to locate the employee via instant messaging and/or automatic telephone calls. The location of the employee is received, in response to polling the list of contacts. The list of contacts is alerted that the employee has been located.

Additional features and advantages are realized through the techniques of the exemplary embodiments. Exemplary embodiments are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of the exemplary embodiments are apparent from the following detailed description taken in conjunction with the accompanying drawings in which:

The detailed description explains exemplary embodiments, together with advantages and features, by way of example with reference to the drawings.

DETAILED DESCRIPTION OF EXEMPLARY EMBODIMENTS

Exemplary embodiments provide techniques for indirect location of an individual through a third party. Often, having the knowledge of who sits nearby an individual is sufficient to locate the individual, where an intermediate can act as a proxy who can in turn alert the individual to an urgent action in accordance with exemplary embodiments. Exemplary embodiments build a system and provide methods to facilitate this knowledge. Furthermore, exemplary embodiments utilize this knowledge to exploit the social network metaphor as it applies to the individual.

Typically, individuals work in an office environment and at a desk. Usually, the desks are numbered and the numbering is sequential. The numbering is most likely done in an organized way. Also, each employee has a designation in terms of a desk number, telephone, office location, extension, etc. In general, this information may be housed in a database. For example, in many cases this information may reside in systems, applications, and products of a data processing system (e.g., in an employee record) or in a corporate directory. Also, this information may reside in an enterprise resource planning software such as SAP/Peoplesoft.

In accordance with an exemplary embodiment, a user may employ indirect location of an employee through a third party by performing a lookup on a corporate directory (e.g., LDAP)

and extracting the desk number for this employee being searched (or extracting this from a SAP system by interrogating the employee's record). A search is then executed against the relevant database(s) for the nearest neighbors that satisfy certain parameters (e.g., being within a particular proximity of the employee being searched for). Once satisfied, a user interface may be presented that lists the names of the nearest neighbors, with real-time presence awareness that allows the user to instant message (IM) these neighbors. Also, in exemplary embodiments, an urgent request to contact an individual can target (via broadcast) all of the individual's nearest neighbors. Accompanying the broadcast is some knowledge (which may be user configurable) that describes the reason the neighbors are being asked to help locate this individual (employee). The broadcast may be configured to allow the recipient (e.g., the nearest neighbors) to know that others have also been polled, or indeed configured to simulate a 1:1 request. Further, in exemplary embodiments, a multi-party IM may be broadcast based on location proximity that gets answered with the desired outcome (e.g., one person locates and contacts the employee in question), and the multi-party IM provides the ability for a response from the successful neighbor to be propagated to all neighbors polled, thereby eliminating the need for others to continue helping.

Figure 1:
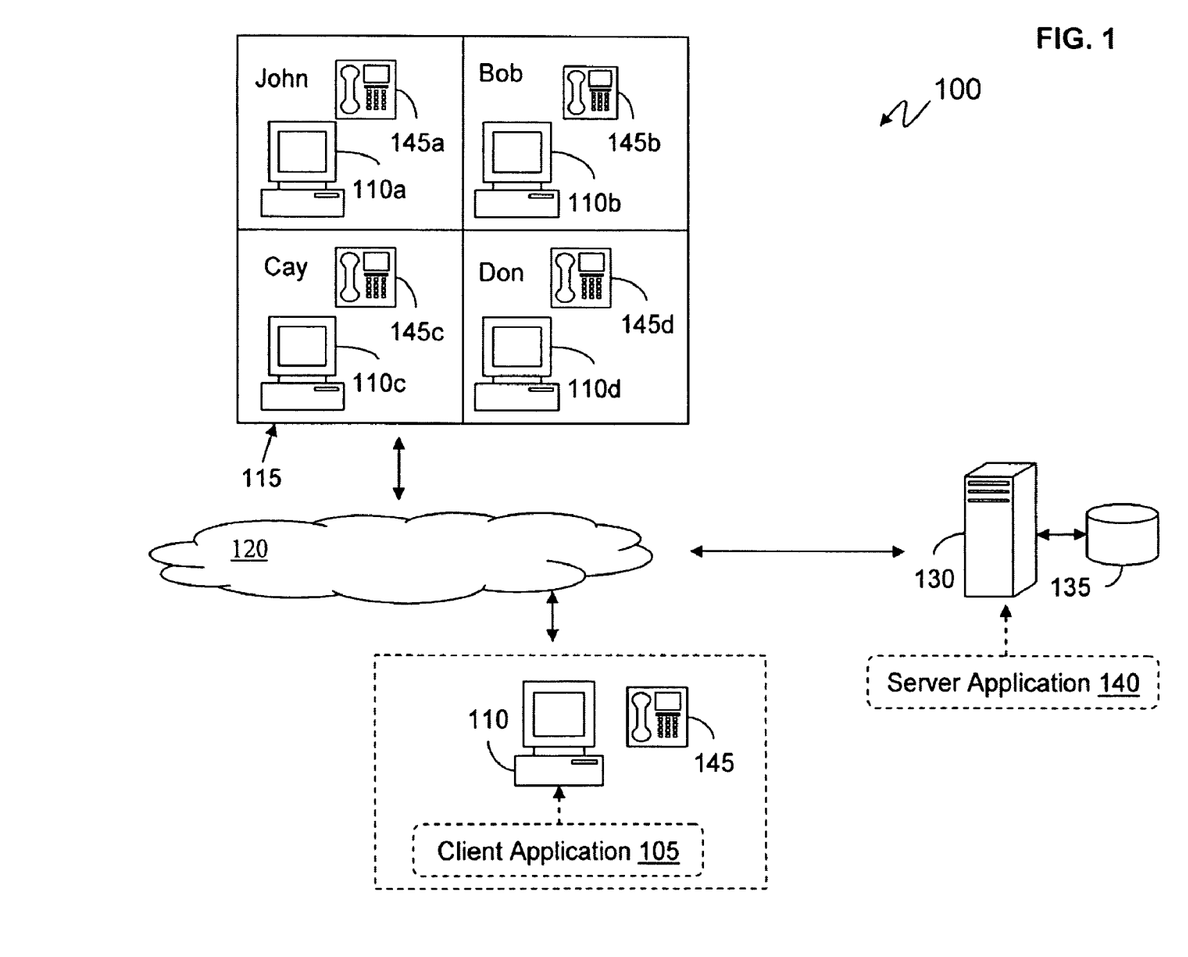
FIG. 1 illustrates a system for exploiting location proximity to derive a desired response, e.g., utilizing instant messaging (IM) and/or telephone calls, in accordance with exemplary embodiments.

FIG. 1 illustrates a system 100 for exploiting location proximity to derive a desired response utilizing, e.g., instant messaging (IM) in accordance with exemplary embodiments. As a non-limiting example, a person utilizing a client application 105 residing on a communication device 110 may be looking for John. John's office may be located within or near a plurality of workspaces 115, and the workspaces 115 are within some proximity to the workspace of John. Each of the workspaces 115 includes a device for communicating (that may be the same or similar to the communication device 110) which is designated for clarity as a communication device 110a, communication device 110b, communication device 110c, and communication device 110d. The communication device 110a represents the device used by John in John's office. The other communication devices 110b, 110c, 110d are used, e.g., by coworkers of John who are neighboring John in their respective workspaces 115, and the coworkers who neighbor John may be Bob, Cay, and Don, respectively. The communication devices 110a, 110b, 110c, 110d each contain the client application 105.

The communication devices 110, 110a, 110b, 110c, 110d communicate with each other and with one or more servers 130 coupled to one or more storage devices 135 via one or more networks 120. A server application 140 resides on the server 130. The server application 140 and the client application 105 interact and share responsibilities for implementing operations in accordance with exemplary embodiments.

The network 120 may include circuit-switched and/or packet-switched technologies and devices, such as routers, switches, hubs, gateways, etc., for facilitating communications among the communication devices 110, 110a, 110b, 110c, 110d, and the server 130. The network 120 may include wireline and/or wireless components utilizing, e.g., IEEE 802.11 standards for providing over-the-air transmissions of communications, The network 120 can be an Internet protocol based network for communication thereon.

Also, the network 120 may include wireline and/or wireless components utilizing standards for, e.g., multimedia messaging services (MMS) such as instant messaging services. The network 120 may include a multimedia messaging center (MMC) which implements the network side of multimedia messaging service (MMS), and makes it possible for a network operator to offer multimedia (e.g., instant) messaging to the end users. The MMC is a highly flexible system, which can be adapted to the needs of the operator and the particular end users involved (such as users of the communication devices 110, 110a, 110b, 110c, 110d.

In accordance with exemplary embodiments, the network 120 can be representative of numerous networks. For example, the network 120 may include and/or access the Internet, and the network 120 may include an intranet that has restricted access for employees.

In accordance with exemplary embodiments, a person (e.g., a searcher) looking for an individual (e.g., John) can input a request, such as "show me nearest neighbors" of John, in the client application 105 of the communication device 110. Associated with this functionality of requesting "show me nearest neighbors" may be parameters in the client application 105 which allow the person to configure, e.g., the definition of the nearest neighbors to be "within N desks away." In the client application 105, additional parameters may include, e.g., "refine list to neighbors who are online", "refine list to neighbors who are part of her team", etc.

In exemplary embodiments, when a person (e.g., using the communication device 110) performs a search for an employee on the client application 105, the client application 105 may interact with (or causes) the server application 140 to perform a look up in the server 130 and/or the storage device 135, and the client application 105 (or server application 140) may extract, e.g., the desk number or extension for this employee (i.e., John) as a result of the look up. In exemplary embodiments, the employee's desk number may be used by the client application 105 (or server application 140) to extract neighbors of the employee. The neighbors may be within N desks (offices) away from the employee, on the same hall, etc. As a non-limiting example, this information may be extracted from a SAP system by interrogating an employee's record. As a non-limiting example, the look up may be performed on a corporate directory utilizing a lightweight directory access protocol (LDAP).

Using the client application 105, a search is executed against the relevant database (e.g., on the server 130 or storage device 135) for the nearest neighbors that satisfy the parameters discussed in exemplary embodiments. In response to the search for the nearest neighbors, a user interface of the client application 105 presents a list of names of the neighbors, with real time presence awareness that allows the user to IM these neighbors. As a non-limiting example, the client application 105 may indicate that the nearest neighbors are coworkers who utilize the communication devices 110b, 110c, 110d. As a non-limiting example, Bob may use the communication device 110b, Cay may use the communication device 110c, and Don may use the communication device 110d. The client application 105 has IM capabilities (or may interact with a client application having IM capabilities) and can recognize if each of the neighbors Bob, Cay, and Don are present. In exemplary embodiments, a separate or different IM application may be used and the IM application can recognize which of John's neighbors are present. In exemplary embodiments, once the list of neighbors is generated, the client application 105 can automatically transmit instant messages to each of the neighbors asking for help in locating John.

Although workspaces 115 illustrate four different offices (or cubicles), the illustration of workspaces 115 is not meant to be limiting in any way and is provided for explanatory purposes. It is understood that the proximity of John relative to his coworkers may be greater or smaller than depicted in FIG. 1. Also, it is understood that scenarios with John is provided as non-limiting examples in accordance with exemplary embodiments, and any individual can be searched for and located using the methods and systems discussed herein.

In exemplary embodiments, an urgent request to contact an individual (John) can target (via broadcast) all of the individual's nearest neighbors. Accompanying the broadcast is some knowledge (user configurable) that describes the reason they are being asked to help locate this individual. The broadcast can be configured to allow the recipient (e.g., the coworkers) to know that others have also been polled or configured to simulate a 1:1 request. The client application 105 (in conjunction with the server application 140) can be used to broadcast the urgent requests to the coworkers to locate the individual via the network 120.

In exemplary embodiments, a response from the successful neighbor who locates the individual can be propagated to all neighbors polled, thereby eliminating the need for others to continue helping. As a non-limiting example, a multiparty IM broadcast may be transmitted from the person who locates and contacts the individual in question (i.e., John), so that others can stop looking.

Further, in accordance with exemplary embodiments, an individual's social network may be used to populate a list of neighbors under a category, e.g., "John's primary social network." John's primary social network is a list that is motivated by activity on John's side (e.g., emails sent and received by John, instant messages sent and received by John, web conferences (WCs), calendar events for John, etc.) and allows a remote person to establish and access John's social network, which can then be exploited. As a non-limiting example, John's primary social network may include people that John personally interacts with outside of work. John's primary social network may include people from an external social network such as MySpace or Facebook.

In exemplary embodiments, a look up on the social network may be performed to extract a collection of people who are closely associated/connected with the person being searched (i.e., John). In this exemplary embodiment, the person's social network is used to populate a list of neighbors under a category, e.g., "John's primary social network". Such a list is motivated by activity on the side of the person (John) being searched for (e.g., email, IM, WCs, calendar events) and allows a remote user to establish the person's social network, which can then be exploited. In exemplary embodiments, developing the social network may involve populating the social network via an integration with other applications like Facebook, Myspace, etc. The social network will be populated by identifying people, who are tightly connected with the person being searched, in other social networking applications (such as, Gmail, Myspace, etc.), and an automatic note will be sent to those people or a message will be posted in their space (e.g., MySpace) with this search request. Likewise, when a search request is answered, a follow on note is transmitted to the same social network to inform that the search is complete and to eliminate the need for others to continue helping.

Figure 4:
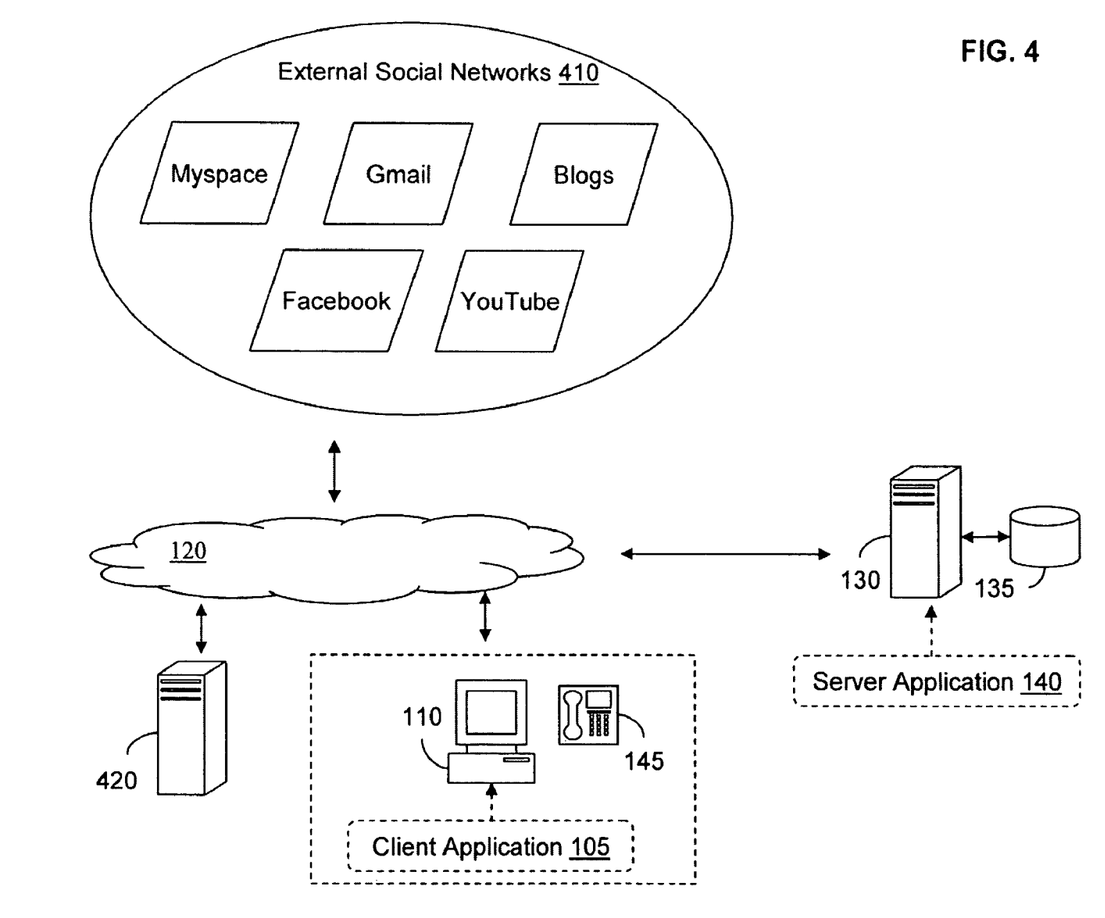
FIG. 4 illustrates a system for exploiting a social network of an employee in accordance with exemplary embodiments.

FIG. 4 illustrates a system 400 for exploiting the social network of an employee in accordance with exemplary embodiments. A searcher utilizing the client application 105 on the communication device 110 may input a request to the server 130 to locate an employee (e.g., John). The server application 140 performs a look up on the server 130 (and/or in the storage device 135) for John's social network. The list of names (and corresponding contact information) in John's social network is extracted by the server application 140, and the list of names is provided to the searcher via a user interface on the client application 105. The searcher can elect to send a message (place a telephone call or include a note in the contact's space) via the client application 105 requesting help to locate John to all or selected ones on the list of names in John's social network. As discussed herein, the list of names in John's social network may include names of other employees and names of those who are not employees (such as friends or relatives).

In exemplary embodiments, there are many ways to develop and populate the social network for the employee John. For example, John may input names and contact information to be included in his social network, and the list is stored on the server 130. John my also provide access to external social networking systems, such as external social networks 410. The external social networks 410 are representative of a plurality of social networks and the necessary hardware and software for implementing the respective external social networks 410. John may provide usernames, access codes, passwords, etc., which can be used to access data, such as names and contact information of friends and family, associated with the external social networks 410, so that the searcher can (e.g., in an emergency) contact the friends and family for assistance in locating John. This collective information may be used to develop John's social network that is stored on the server 130.

Also, according to exemplary embodiments, the server application 140 may parse server 420 for information relating to John. The server 420 may be a work email sever or a work telephone server. The server application 140 may select contacts that are regularly emailed and called by John to include in John's social network. For example, the server application 140 may have predefined parameters for selecting a person that John emails on average a certain amount (e.g., greater than 3) of times per week (or per month) to include in the list of John's social network. Likewise, the sever application 140 may select numbers that John calls on average three or more times per week to include in the list for John's social network. It is contemplated that various thresholds may be utilized to determine if a particular contact should be included in the John's social network stored on the server 130. For example, the server application 140 may be set to exclude contacts for numbers or emails that are recognized as employees of the company or that are recognized as business related, because the server application 140 may be set to select personal contacts. Moreover, the manner in which contacts are selected by the server application 140 to be added to the list for the social network is not meant to be limiting, and examples are provided for explanatory purposes.

Further, the server application 140 may exploit John's connectivity to the external social networks 410, e.g., using a snooping program, so that contacts can be determined by John's interconnectivity to the external social networks 410. For example, when John is using the communication device 110a, the server application 140 may observe John's connection to a respective one of the external social networks 410 and snoop to collect information related to contacts (people that John communicates with) of the external social network 410. These contacts discovered from exploiting (snooping on) John's connectivity to the external social networks 410 may be added to the John's social network stored on the server 130. There are many functions and configurations to snooping type programs, which are understood by those skilled in the art.

Additionally, in exemplary embodiments, individuals (such as John) are able to specify an acquaintance list, which is a user defined preference associated with John's instant messaging client (e.g., the client application 105). The acquaintance list may reside on the server 130 and/or storage device 135 and can be exploited using techniques discussed herein. The user defined acquaintance list may be set to override the other three types of categories defined above, such as LDAP, proximity, or social network. Once the acquaintance list or any other list is specified as having priority, the acquaintance list or the other list is provided to users who poll for "the nearest neighbors." When the names (and/or extensions, desk numbers, telephone numbers, etc.,) of the nearest neighbors are returned, the acquaintance list floats to the top of any names of neighbors provided and may be designated under a category titled "John's preferred acquaintance". The users who are given permission to access this "acquaintance list" can be modified by an individual (i.e., John), or the default could be set to all users who are part of the same organization as the individual.

Also, in exemplary embodiments, a taxonomy may be associated with the acquaintance list, where the taxonomy is user defined. As a non-limiting example, the taxonomy may read, "For family emergencies please contact Joe." For family emergencies, a group of names (and related contact information) may be provided. As non-limiting examples, the taxonomy may read, "For work emergencies please contact Mary, Ann, and Michael."

In accordance with exemplary embodiments, this collective knowledge (which includes the various location techniques, systems, and collection of information) can be used to locate an individual (e.g., John) in case of an emergency, resolving a critical issue, meeting participation, or any need for communication by, e.g., right clicking on the individual on the client application 105 or via phone application. This knowledge base can be used for communicating with the individual when the individual is missing, if the individual is not available temporarily (i.e., do not disturb), or in case of a family emergency.

Figure 2:
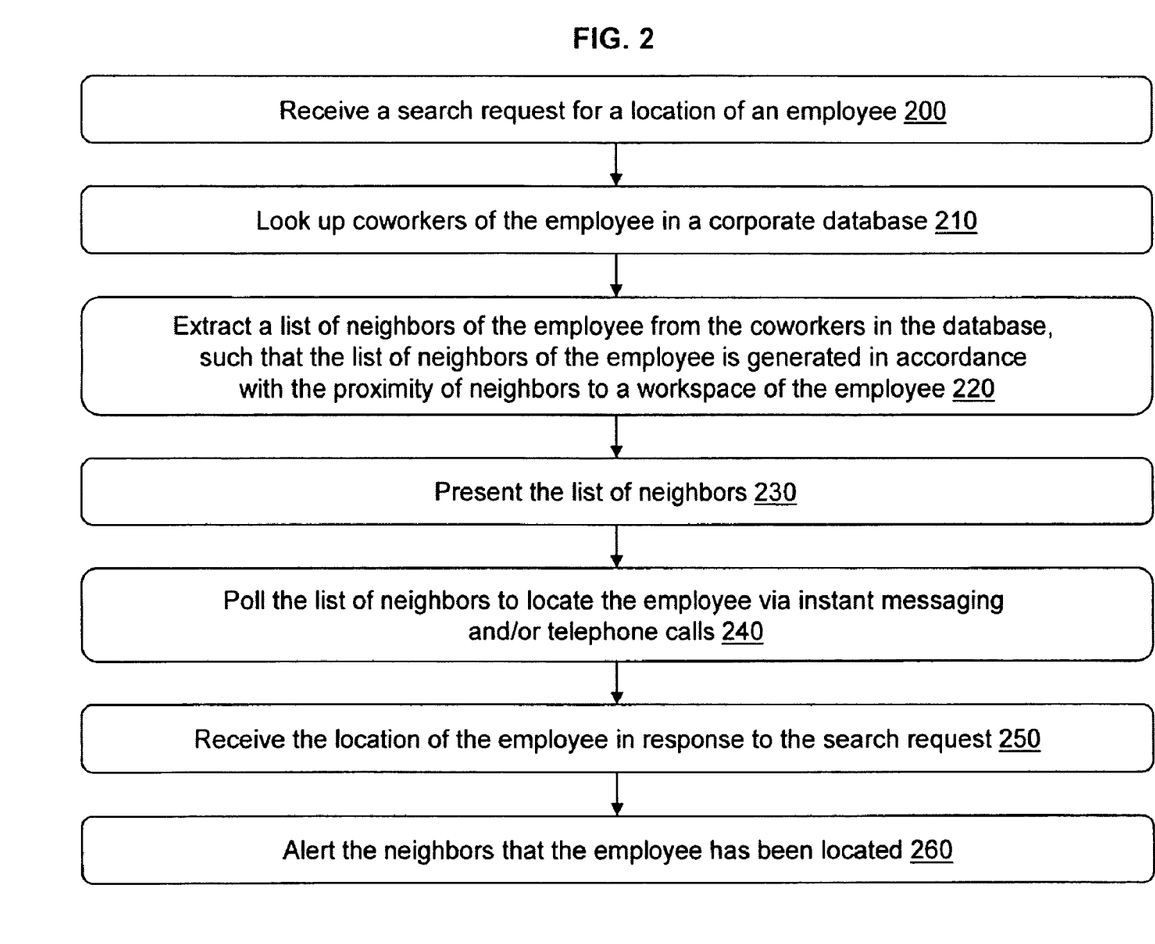
FIG. 2 illustrates a method for exploiting location proximity to derive a desired response in accordance with exemplary embodiments.

FIG. 2 illustrates a method for exploitation of location proximity to derive a location of an employee (e.g., John) in a corporation utilizing instant messaging or automatic telephone calls in accordance with exemplary embodiments.

A search request for a location of an employee is received by the client application 105 at 200. As a non-limiting example, the search request may be input to find John because John is late for a meeting, and John cannot be reached at his communication device 110a nor his telephone 145a. The server application 140 may perform a look up of a plurality of coworkers of the employee (John) in a corporate database (such as the storage device 135) at 210.

In exemplary embodiments, a list of neighbors of the employee John is extracted by the server application 140 from the plurality of coworkers in the corporate database, and the list of neighbors of the employee is generated (e.g., by the client application 105 or the server application 140) in accordance with the proximity of neighbors (in the list of neighbors) to a workspace of the employee John at 220. In exemplary embodiments, the server application 140 (or the client application 105) may search corporate files stored on the server 130 and/or the storage device 135 to locate coworkers who are within a certain proximity to the employee. During the search request, a parameter in the client application 105 may be set so that coworkers who are, e.g., within N desks away may be included in the list of neighbors. Also, a parameter in the client application 105 may be set so that coworkers who are on the same or nearby hall, in the same or nearby cubicle, and/or on the same or nearby wing and floor may be included in the list of neighbors. Additionally, a parameter in the client application 105 may be set to include coworkers are in the same work group (e.g., research and development of new product lines) as the employee.

The client application 105 presents the list of neighbors on the communication device 110, in response to the search request by the person at 230.

The list of neighbors is polled via instant messaging and automatic telephone calls to locate the employee at 240. The person who made the search request may select the neighbors of the list on the client application 105 to poll, or the client application 105 may automatically poll everyone in the generated list of neighbors on behalf of the person making the search request. As a non-limiting example, the person who requested the search may chose to remove some of the coworkers from the list of neighbors, because the person may know, e.g., that those coworkers are absent. In exemplary embodiments, the client application 105 may automatically send messages to the entire list of neighbors without the person removing any coworkers.

In exemplary embodiments, polling the list of neighbors may be accomplished via instant messaging and/or automatic telephone calls. The person who made the search request may input a message (text and/or voice) in the client application 105 of the communication device 110 requesting the location of the employee, and the message is transmitted to each neighbor in the list of neighbors. As a non-limiting example, the person who made the search request using the communication device 110 may input a text message "Please find John and contact me" in the client application 105, and the client application 105 may transmit the message via instant messaging to the people of the list of neighbors (e.g., the message may be sent to the communication devices 110b, 110c, 110d). In exemplary embodiments, the person who made the search request can use the communication device 110 and/or the telephone 145 to input/record a voice message. As a non-limiting example, the voice message "Please find John and contact me" may be input/recorded using a microphone (not shown) in the client application 105. Also, the voice message may be recorded using the telephone 145 and the voice message can be received by the client application 105 and transmitted to the telephones 145b, 145c, 145d of the neighbors. The client application 105 (or another application) may include capabilities for voice over Internet protocol (VoIP), the client application 105 may include capabilities for telephony or be connected to equipment with capabilities for telephony, and the client application 105 may transmit the recorded voice message to the list of neighbors. As a non-limiting example, the voice message may be transmitted to the communication devices 110b, 110c, 110d or to the telephones 140b, 140c, 140d, so that the list of neighbors can assist in locating the employee.

In response to polling the list of neighbors, the location of the employee can be received by the person requesting the search at 250. As a non-limiting example, one of the neighbors (e.g., Cay on the communication device 110c or on the telephone 140c) may respond back with an instant message (or voice message) "I have found John." The instant message or voice message may be respectively received on the communication device 110 or the telephone 104 by the person who made the search request. The neighbors may be alerted that the employee (John) has been located and there is no need to continue their search at 260. As a non-limiting example, the neighbor who located John may transmit a global instant message, "I have found John," to the other neighbors on the list. As another example, the person who made the search request may transmit an instant message on the communication device 110 indicating that John has been located, and the neighbors can cease searching for John.

In exemplary embodiments, the corporate database may include a lightweight directory access protocol (LDAP) database that comprises an organization of the coworkers. In the corporate database (e.g., the storage device 135), the LDAP database also includes the relative proximity of the coworkers (including John) to each other. This proximity may be in terms of desk numbers, office numbers, cubicle numbers, bay numbers, wings of floor, halls on a floor, organization groups (such as the research and development group for new products), floors of a building, etc.

Also, in exemplary embodiments, the corporate database may include an acquaintance list database that is defined by the employee. The acquaintance list database may contain certain coworkers selected by the employee (John). As a non-limiting example, the coworkers on the acquaintance list may be coworkers that John regularly works with (e.g., on projects), coworkers that John goes to lunch with, coworkers that John frequently associates with, and the like. John may enter the names (and contact data) for these coworkers in the client application 105 residing the on communication device 110a. The various names input by John in the client application 105 can be included in the acquaintance list database and stored, e.g., on the server 130 and/or storage device 135.

In exemplary embodiments, the acquaintance list database may also include non-coworkers input by the employee (John). John may include the contact data of various people who may not be coworkers but the people may be able to provide the location of John, and/or contact John. As non-limiting examples, in the acquaintance list database, John may include the contact data for his wife, best friend, mother, sister, or others, and they may be contacted in case of an emergency.

In accordance with exemplary embodiments, the various processes and methods may be automated. As a non-limiting example, the person making the search request may select a search for employee field in the client application 110 on the communication device 110 and input John's name in the search for employee field. The client application 105 being in communication with the server application 130 can look up neighbors (e.g., coworkers within proximity of John's workspace) in the corporate database that may be stored on the server 130 and/or the storage device 135. The server application 140 may extract and/or generate the list of neighbors in accordance with the proximity of the coworkers to the workspace of John. The client application 105 may present the list of neighbors on to the person making the request. The client application 105 polls the list of neighbors by asking the neighbors to locate John. The client application 105 may use instant messaging to poll (ask) the neighbors about the location of John. For example, the client application 105 may send a standard text message "Please find John and contact me" to each of the neighbors on their respective communications devices 110b, 110c, 110d. The client application 105 present any response received from the neighbors to the person on the communication device 110. If desired, after initially making the search request, the person can wait to receive responses. Also, the person may deselect some names from the list of neighbors, e.g., if he or she knows that one of the neighbors is not at his desk.

Figure 5:
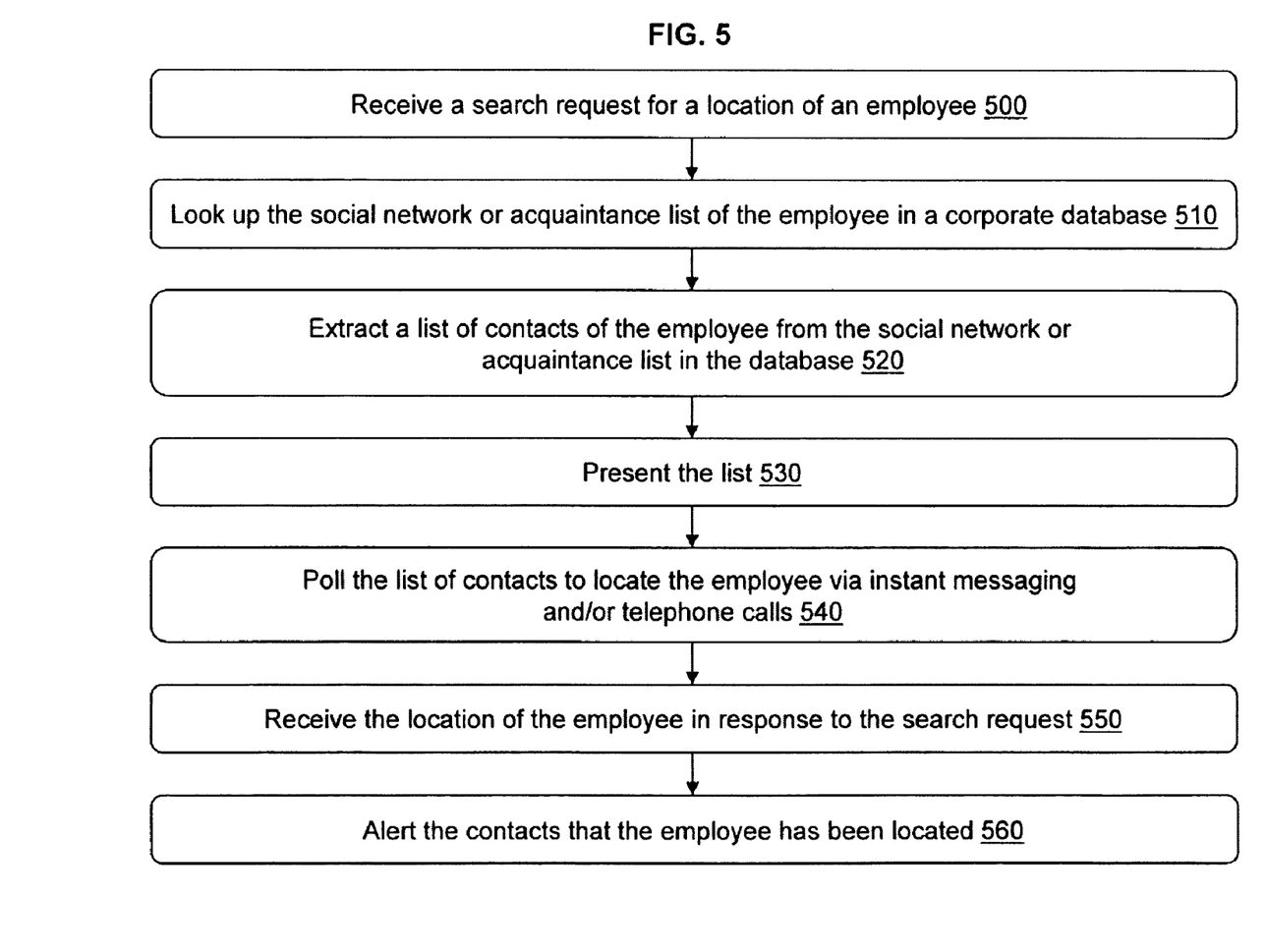
FIG. 5 illustrates a method for exploitation of a social network/acquaintance list of an employee to derive a location of an employee in a corporation in accordance with exemplary embodiments.

Referring to FIG. 5, FIG. 5 illustrates a method for exploitation of the social network/acquaintance list of an employee to derive a location of an employee in a corporation in accordance with exemplary embodiments.

The client application 105 may receive a search request for a location of an employee at 500. The server application 140 looks up the social network and/or acquaintance list of the employee in a corporate database (for example on the server 130) at 510. The server application 140 extracts a list of contacts of the employee from the social network and/or acquaintance list in the database at 520. The client application 105 presents the list of contacts at 530. The client application 105 is configured to poll the list of contacts to locate the employee via instant messaging and/or telephone calls at 540. In response to the search request, the location of the employee is received, e.g., on the communication device 110 or the telephone 145 at 550. The searcher can alert the contacts that the employee has been located at 560.

As discussed herein, the corporate database may include an acquaintance list database (residing on the server 130) that is defined by the employee. The acquaintance list database may include selected ones of a plurality of coworkers input by the employee and/or non-coworkers input by the employee. Also, the corporate database may include a social network database (residing on the server 130) that includes input from external social networking entities, such as the external social networks 410, and input extracted from emails and telephone calls (e.g., on the server 420) to and from the employee.

In accordance with exemplary embodiments, the polling of the list of contacts via instant messaging and/or automatic telephone calls may include the client application 105 receiving input of a message requesting the location of the employee, such that the message is transmitted to each contact in the list of contacts or to selected contacts in the list. The polling may include receiving input of a voice message requesting the location of the employee, such that the voice message (via the client application 105 or the telephone 145) is transmitted to each contact in the list of contacts or to selected contacts.

In accordance with exemplary embodiments, it is understood that responsibilities may be shared between the client application 105 and the server application 140. Also, it is contemplated that some responsibilities designated herein to the client application 105 or the server application 140 may be performed by the other. Furthermore, exemplary embodiments are capable of being implemented in a client-server architecture (environment), and exemplary embodiments comprise the necessary hardware and software components to operate in a client-server architecture (environment) as understood by one skilled in the art. Indeed, the various descriptions provided herein are for explanatory purposes and are not meant to be limiting in any manner. Furthermore, exemplary embodiments detailed herein may be implemented on, e.g., a Lotus Sametime® platform.

Figure 3:
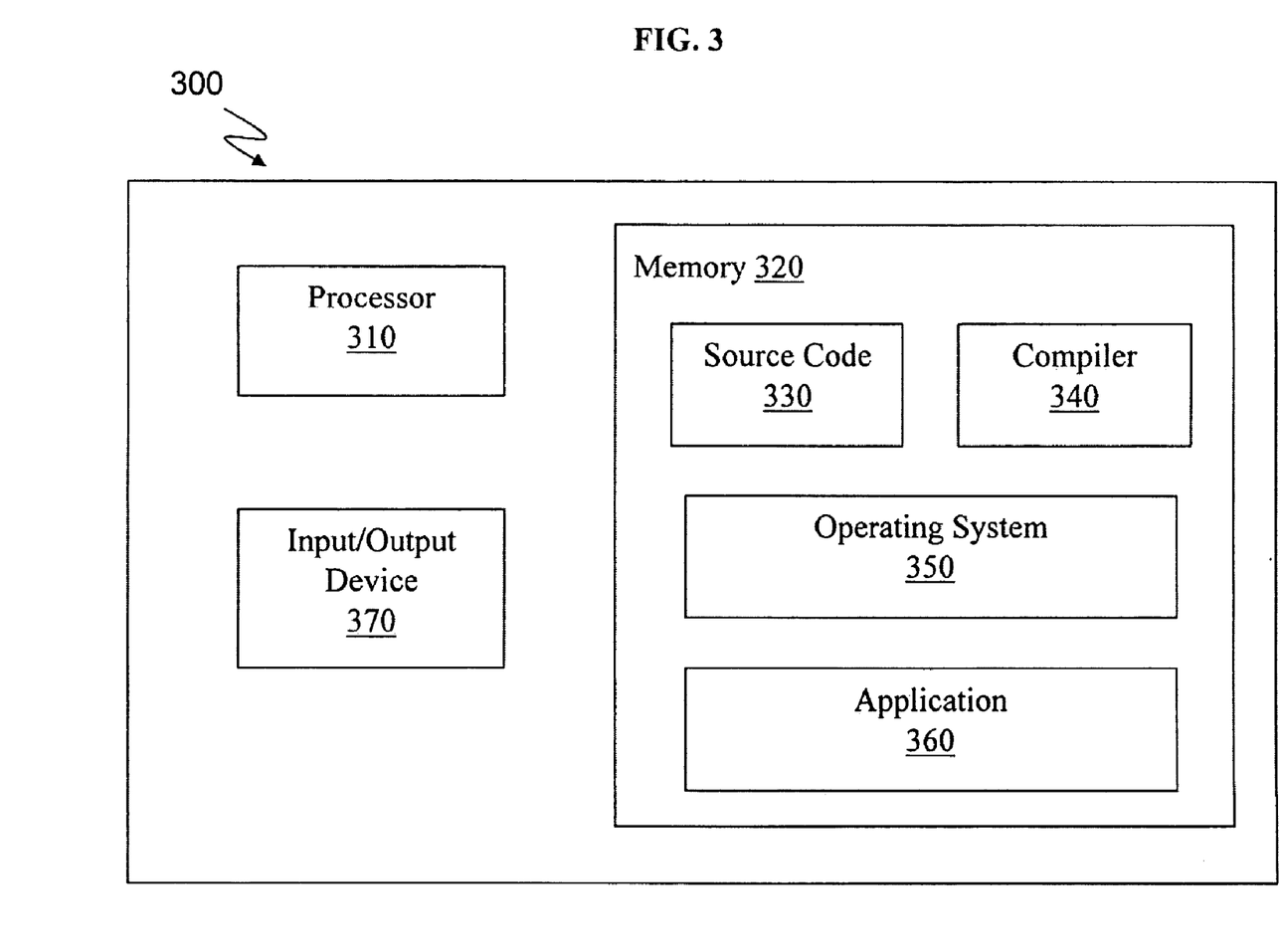
FIG. 3 illustrates an example of a computer in which exemplary embodiments may be incorporated.

Referring to FIG. 3, FIG. 3 illustrates an example of a computer 300 having capabilities, which may be included in exemplary embodiments. Various methods and processes discussed above may utilize the capabilities of the computer 300. One or more of the capabilities of the computer 300 may be incorporated in the communication devices 110, 110b, 110c, 110d, the network 120, the server 130, the server 420, and/or any element discussed herein.

The computer 300 includes, but is not limited to, PCs, workstations, laptops, PDAs, palm devices, servers, and the like. Generally, in terms of hardware architecture, the computer 300 may include one or more processors 310, memory 320, and one or more input and/or output (I/O) devices 370 that are communicatively coupled via a beat interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.,) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and an application 360 (which may be one or more applications) in accordance with exemplary embodiments. As illustrated, the application 360 comprises numerous functional components for implementing the features and operations of the exemplary embodiments. The application 360 of the computer 300 may represent the various applications referred to herein, but the application 360 is not meant to be a limitation. The operating system 350 essentially controls the execution of other computer programs, and provides scheduling, input-output control, file and data management, memory management, and communication control and related services.

The application 360 may be a source program, executable program (object code), script, or any other entity comprising a set of instructions to be performed. When a source program, then the program is usually translated via a compiler (such as the compiler 340), assembler, interpreter, or the like, which may or may not be included within, the memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to, a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such at the Internet, a WiFi network, a PAN, the PSTN, the network 120, and the like.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

It is understood that the computer 300 includes non-limiting examples of software and hardware components that may be included in various devices and systems discussed herein, and it is understood that additional software and hardware components may be included in the various devices and systems discussed in exemplary embodiments.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for exploitation of a social network to derive a location of an employee in a corporation utilizing instant messaging or automatic telephone calls, comprising:

receiving a search request for a location of an employee;

looking up a social network or acquaintance list of the employee in a corporate database;

extracting a list of contacts of the employee from the social network or acquaintance list in the corporate database;

presenting the list of contacts, in response to the search request;

polling the list of contacts to locate the employee via at least one of instant messaging and automatic telephone calls;

receiving the location of the employee, in response to polling the list of contacts; and alerting the list of contacts that the employee has been located;

wherein the corporate database comprises at least one of:

an acquaintance list database that is defined by the employee, the acquaintance list database comprising: selected ones of a plurality of coworkers input by the employee; and non-coworkers input by the employee; and a social network database that comprises: input extracted from external social networking entities; and input extracted from emails, instant messages, or telephone calls to and from the employee; and wherein the input extracted from the external social networking entities for the social network database is extracted by at least one of:

receiving login information to the external social networking entities corresponding to the employee and accessing the external social networking entities to obtain contacts for the list of contacts; and snooping on the employee's communication connections to the external social networking entities to obtain contacts for the list of contacts.

2. The method of claim 1, wherein the polling of the list of contacts via the at least one of instant messaging and automatic telephone calls comprises at least one of:

receiving input of a message requesting the location of the employee, wherein the message is transmitted to each contact in the list of contacts; and receiving input of a voice message requesting the location of the employee, wherein the voice message is transmitted to each contact in the list of contacts.

3. The method of claim 1, wherein the input extracted from emails, instant messages, or telephone calls to and from the employee for the social network database is extracted by:

checking for a predetermined number of communications from emails, instant messages, or telephone calls to and from the employee; and in response to the predetermined number of communications being met for emails, instant messages, or telephone calls, adding contacts to the list of contacts that correspond to the emails, instant messages, or telephone calls.

* * * * *